(12) United States Patent
Letendre

(10) Patent No.: US 6,402,235 B1
(45) Date of Patent: Jun. 11, 2002

(54) SPLIT BICYCLE SEAT

(76) Inventor: Rodger B. Letendre, 1158 Hooksett Rd., Hooksett, NH (US) 03106

( * ) Notice: Subject to any disclaimer, the term of this patent is extended or adjusted under 35 U.S.C. 154(b) by 0 days.

(21) Appl. No.: 09/388,690

(22) Filed: Sep. 2, 1999

Related U.S. Application Data

(60) Provisional application No. 60/099,074, filed on Sep. 4, 1998.

(51) Int. Cl.⁷ .................................................. B60N 2/38
(52) U.S. Cl. ...................... 297/195.1; 297/201; 297/312
(58) Field of Search .............................. 297/201, 195.1, 297/312

(56) References Cited

U.S. PATENT DOCUMENTS

| 606,818 | A | * | 7/1898 | Best | 297/201 |
| 619,768 | A | * | 2/1899 | Lewis, Jr. | 297/312 |
| 656,854 | A | * | 8/1900 | Nord | 297/312 |
| 5,123,698 | A | * | 6/1992 | Hodges | 297/201 |
| 5,988,740 | A | * | 11/1999 | Caraballo | 297/201 |

FOREIGN PATENT DOCUMENTS

| DE | 106430 | * | 11/1899 | 297/201 |
| GB | 20112 | * | 1/1984 | 297/201 |
| GB | 2121740 | * | 1/1984 | 297/201 |

* cited by examiner

Primary Examiner—Peter M. Cuomo
Assistant Examiner—Stephen Vu
(74) Attorney, Agent, or Firm—Mirick O'Connell

(57) ABSTRACT

A split bicycle seat of this invention comprises: a seat mount; and two split seat halves having a transverse rotational axis, each half mounted to the seat mount so that the seat halves are capable of rotating at least partially about the transverse axis.

10 Claims, 10 Drawing Sheets

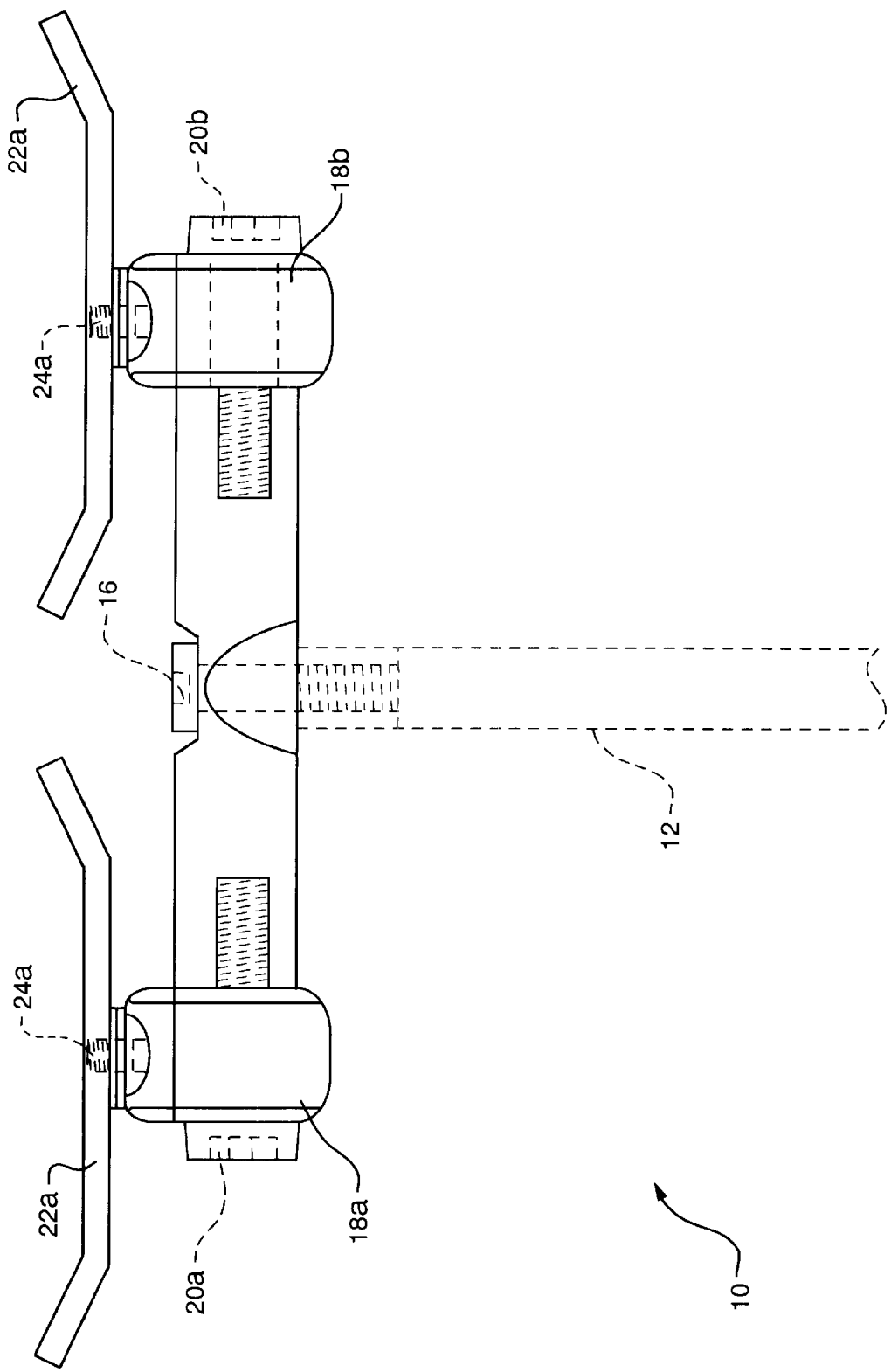

SPLIT BICYCLE SEAT

CROSS-REFERENCE

This is a continuation-in-part of U.S. application Ser. No. 60/099,074 filed on Sep. 4, 1998.

FIELD OF THE INVENTION

This invention relates to a seat for a bicycle and more specifically to a split bicycle seat.

BACKGROUND OF THE INVENTION

Bicycle seats universally comprise a single seat upon which the bicyclist sits with his or her legs on either side of the seat. These single seats are available in numerous shapes and sizes with varying levels of comfort. Although single seats may usually be adjusted to accommodate a bicyclist's height and usually may be adjusted to tip forward or back, once the adjustment is made, the seat remains stationary. Even with these adjustments, however, single seats are generally uncomfortable and place virtually all of the bicyclist's weight on the bicyclist's spine. With every bump, the pressure on the user's spine increases exponentially.

SUMMARY OF THE INVENTION

It is therefore a primary object of this invention to provide a split bicycle seat that is ergonomically designed.

It is a further object of this invention to provide a comfortable, form-fitting, split bicycle seat which distributes the user's weight to the user's hips rather than to the user's spine.

It is a further object of this invention to provide a split bicycle seat which rotates forward and back and from side to side in response to the user's body movements as the user pedals a bicycle.

It is a further object of this invention to provide a split bicycle seat that can be adjusted according to the size of the bicyclist.

A preferred embodiment of the split bicycle seat of this invention comprises: a seat mount; and two split seat halves having a transverse rotational axis, each half mounted to the seat mount so that the seat halves are capable of rotating at least partially around the axis. The seat mount preferably comprises, a vertical shaft; a transverse rod fixed to the vertical shaft; and two split seat mounts fixed to the transverse rod, wherein the vertical shaft is fixed to the frame of the bicycle. The split seat halves are preferably capable of rotating at least partially around the transverse axis independent of each of other and preferably have a front portion having a concave leading edge and at least one seat cushion fixed to each of the split seat halves.

The split seat mounts may each comprise, a horizontal mounting surface; two vertical opposing walls having a bore through each wall corresponding to the transverse axis of the split seat halves; and a bolt extending through the bores so that the split seat halves are capable of rotating at least partially about the bolt, wherein each of the split seat mounts further comprises a pillow block joint, interposed between the vertical opposing walls, having a transverse bore through which the bolt transversely extends.

The split seat mounts may alternatively each comprise, a horizontal mounting surface; and two pillow block joints each having a transverse bore therethrough corresponding to the transverse axis of the split seat halves and fixed to the transverse rod with a bolt extending through the bores, wherein the pillow block joints are fixed to the transverse rod with a vertical mounting bolt. The split seat halves preferably are capable of rotating from side to side about a longitudinal axis about 10°.

Another preferred embodiment of the split seat of the invention for a bicycle, comprises: a seat mount comprising, a vertical shaft fixed to the frame of the bicycle, a transverse rod fixed to the vertical shaft, two split seat mounts fixed to the transverse rod; and two split seat halves having a transverse rotational axis, each half mounted to the seat mount so that the seat halves are capable of rotating at least partially around the axis. In this embodiment the split seat mounts may similarly comprise, a horizontal mounting surface; two vertical opposing walls having a bore through each wall corresponding to the transverse axis of the split seat halves; and a bolt extending through the bores so that the split seat halves are capable of rotating at least partially about the bolt. Alternatively, the split seat mounts may each comprise, a horizontal mounting surface; and two pillow block joints each having a transverse bore therethrough corresponding to the transverse axis of the split seat halves and fixed to the transverse rod with a bolt extending through the bores, wherein the pillow block joints are fixed to the transverse rod so that the split seat halves are capable of rotating from side to side about a longitudinal axis, wherein the pillow block joints are fixed to the transverse rod so that the split seat halves are capable of rotating to each side about 10°.

Yet another embodiment of the split seat of the invention for a bicycle, comprises, a seat mount comprising, a vertical shaft, a transverse rod adjustably fixed to the vertical shaft, two split seat mounts adjustably fixed to the transverse rod; and two split seat halves having a transverse rotational axis, each half mounted to the seat mount so that the seat halves are capable of rotating at least partially around the axis.

BRIEF DESCRIPTION OF THE DRAWINGS

Other objects, features and advantages will occur to those skilled in the art from the following description of the preferred embodiments and the accompanying drawings in which:

FIG. 1 is a cross-sectional view of the split bicycle seat of the preferred embodiment of the invention;

DETAILED DESCRIPTION OF THE PREFERRED EMBODIMENTS

The split bicycle seat of the invention is ergonomically designed to provide a comfortable form-fitting seat, comprising two parallel, twin seat portions which, independent of each another, rotate at least forward and back and from side to side, in response to the user's body movements. The motion of the twin seats are designed to mimic the up and down movement of the human leg and may further mimic the coaxial hip joint. As the user pedals, each twin seat alternately rotates forward during the downward stroke of the user's leg and returns to the level or neutral position by a tension spring. Lateral motion may be further achieved by mounting each twin seat portion to a common, transverse, support rod using a ball and socket joint, otherwise known as a pillow block joint.

Figure 2A:
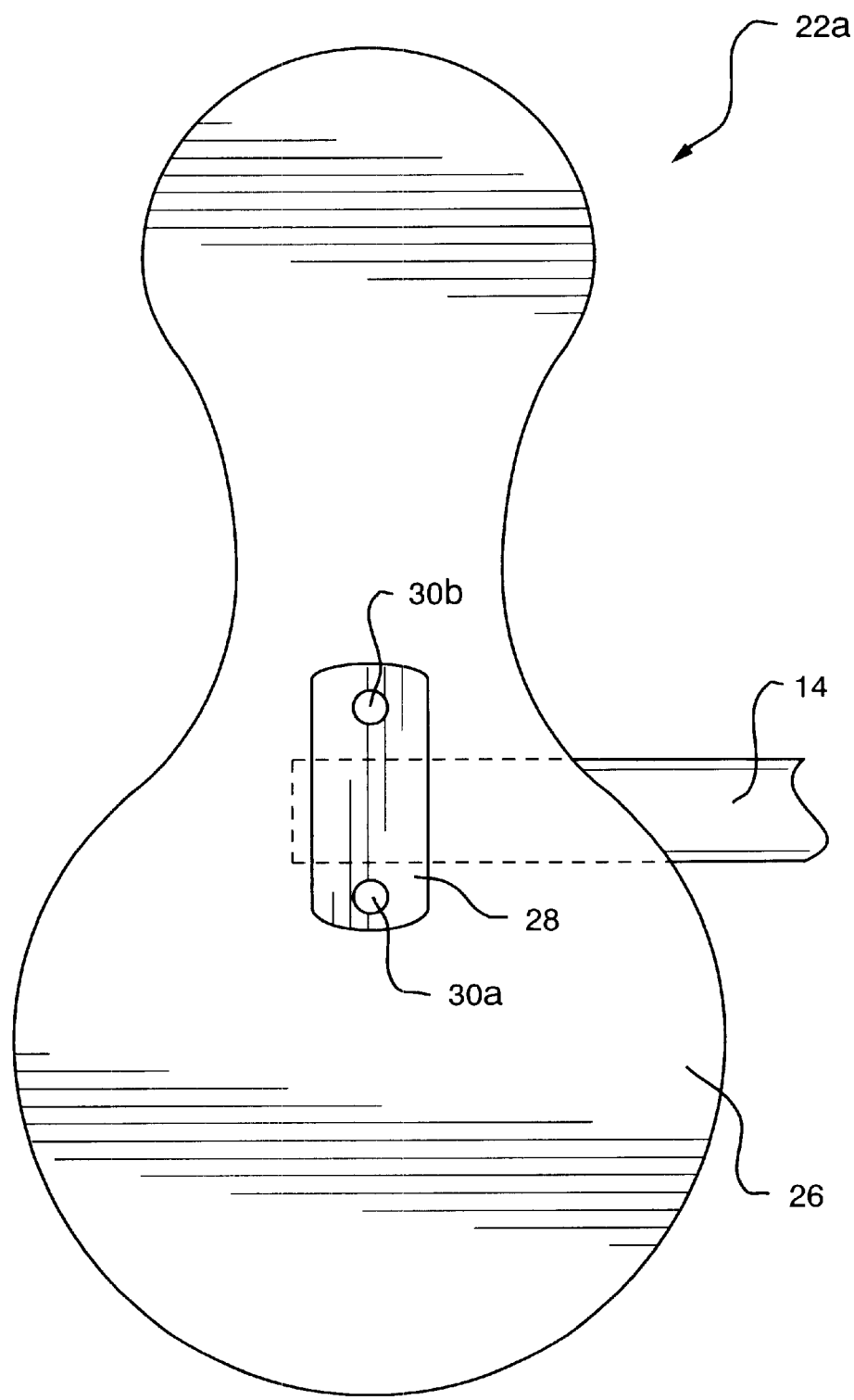
FIG. 2A is a bottom view of one of the twin seat portions of the preferred embodiment shown in FIG. 1.

The details of the preferred embodiments of the split bicycle seat of the invention are shown in the drawings. Specifically, FIG. 1 shows a preferred embodiment of the split bicycle seat generally referred to as split seat 10. Split seat 10 is made of six basic components: twin seats 22a and 22b, seat mounts 18a and 18b, transverse rod 14 and vertical shaft 12. Twin seats 22a and 22b are fixed to mounting brackets 23a and 23b (shown in FIG. 3) of seat mounts 18a and 18b with ½ inch threaded mounting bolts 24a and 24b, respectively. The mounting bolts of each twin seat are threaded through holes 30a and 30b in mounting plate 28 and seat plate 26 (shown in FIG. 2A). Seat mounts 18a and 18b are fixed in position around and along transverse rod 14 by ½ inched threaded bolts 20a and 20b, respectively, each having a ⅝ inch diameter head. Transverse rod 14 is fixed through a central hole in rod 14 to an internally threaded upper end of vertical shaft 12 using ½ inch threaded, aluminum bolt 16. Vertical shaft 12 is preferably a preformed hollow aluminum tube about 8 to 12 inches long. Transverse rod 14 is a preformed, solid, aluminum rod about 8 ½ inches long. Vertical shaft 12 and transverse rod 14 each have an outside diameter of about 1 1/16 inches. Vertical shaft may be connected to the host frame and vertically adjusted to the user's height by any suitable means including, for example, a nut and bolt.

Figure 2B:
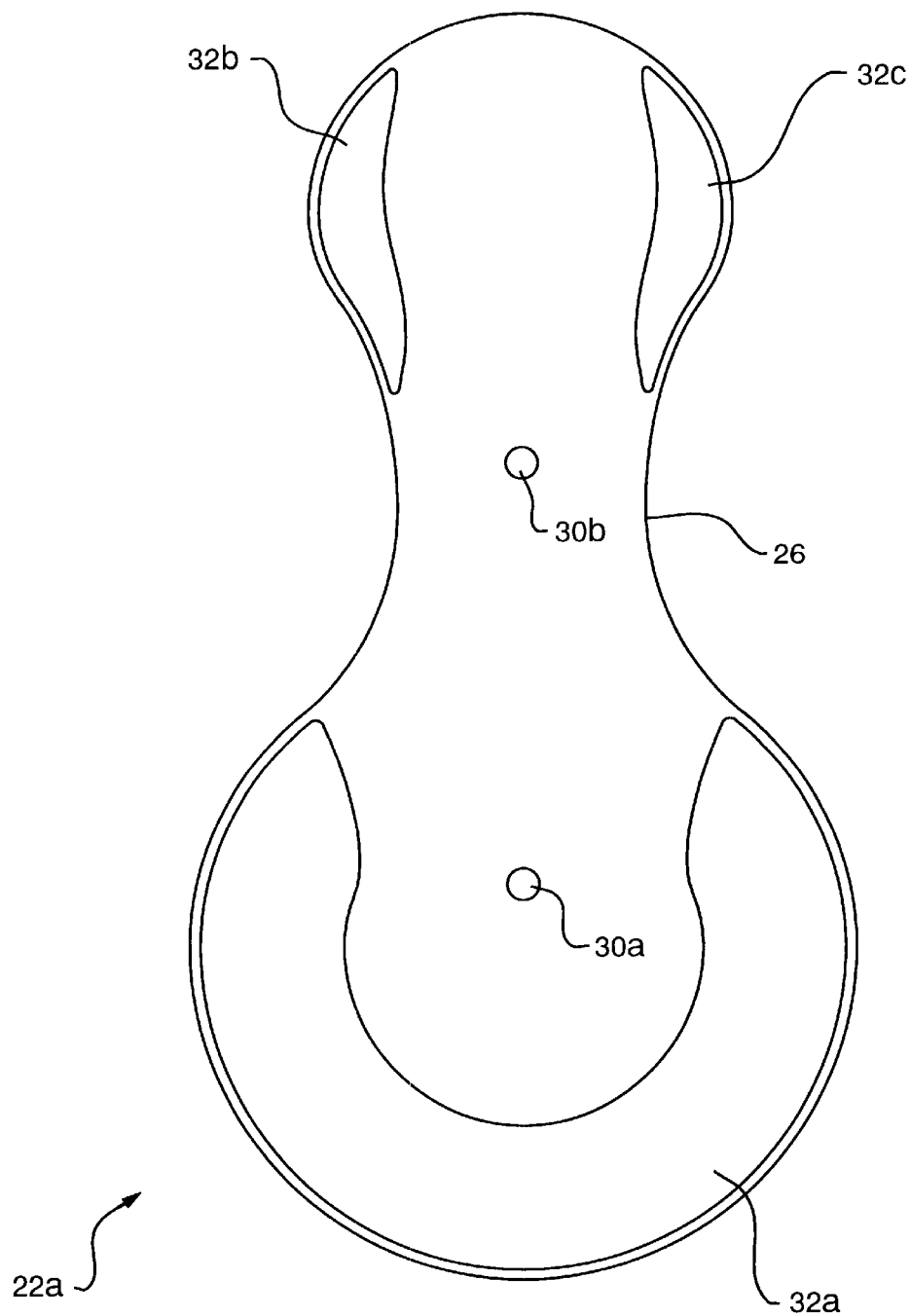
FIG. 2B is a top view of the twin seat portion shown in FIG. 2A.

As shown in FIG. 2B, contoured high density foam pads 32a, 32b and 32c are removably attached to the top of preformed, aluminum or plastic seat plate 26 with screws (not shown). The seat frame may include additional holes for receiving the screws for the pads so that the seats can be repositioned forward or backward on seat mounts 18a and 18b as desired by the user. Upholstery 40 (shown in FIG. 3) should completely cover the top of twin seats 22a and 22b, including the contoured pads, and lap around the edges as shown in FIG. 3.

Figure 3:
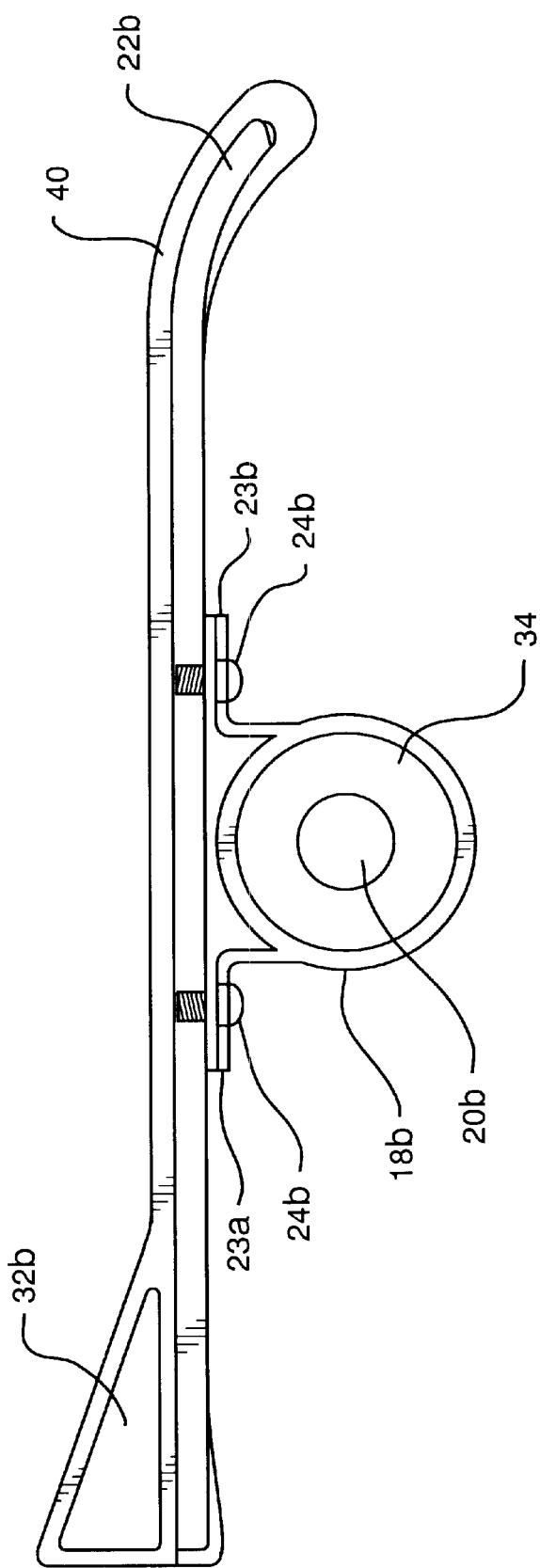
FIG. 3 is a partial cross-sectional side view of the split bicycle seat of the preferred embodiment shown in FIG. 1.
Figure 5:
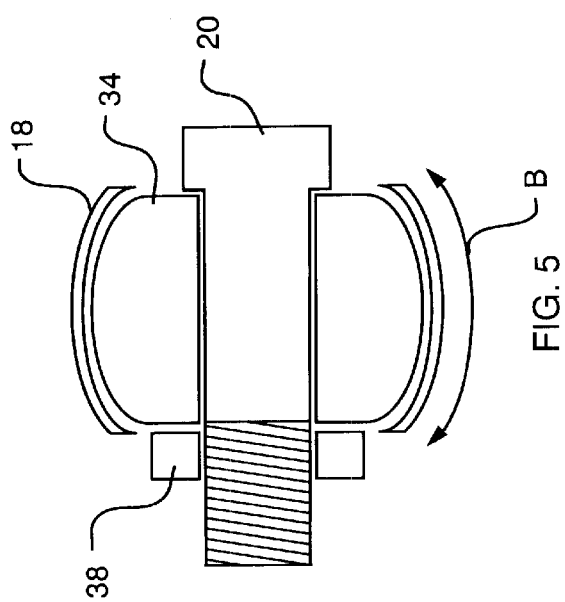
FIG. 5 is a cross-sectional rear view of the ball and socket joint of the preferred embodiment shown in FIG. 1, shown with an added collar.
Figure 4:
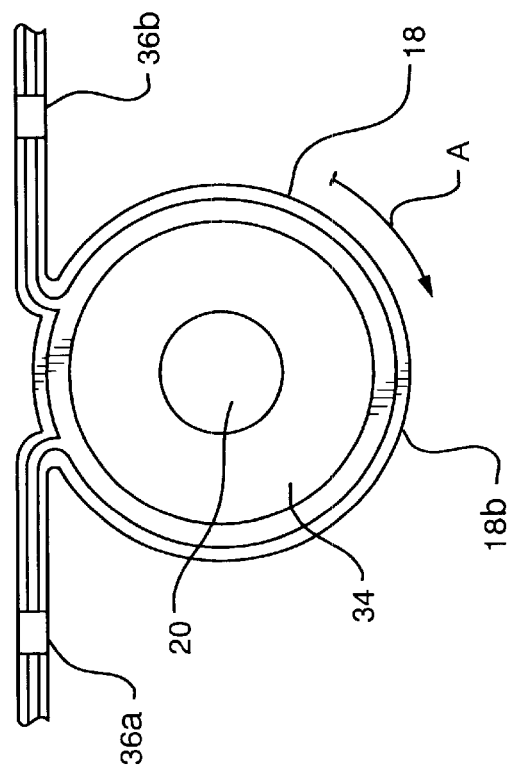
FIG. 4 is a cross-sectional side view of the ball and socket joint of the preferred embodiment shown in FIG. 1.

FIGS. 3, 4 and 5 illustrate the connection between each of the twin seats and their respective seat mounts, and the rotational action of the ball and socket joints. Although only the right twin seat is shown in FIGS. 3, 4 and 5, the structure and action is the same for both twin seats. In FIG. 3, twin seat 22b is mounted to seat mount 18b with bolts 24b through mounting brackets 23a and 23b. Together with self-lubricating, nylon bearing 34, seat mount 18b forms a ball and socket joint, commonly known as a pillow block joint, which is held in place around transverse rod 14 with bolt 20b. As the user moves his or her leg up and down, seat mount 18b will rotate forward in the direction of arrow A. In the preferred embodiment the seat mount should be capable of rotating forward about 160° from its level position. To facilitate the natural outward and inward rolling action of the user's hip, the pillow block joint further allows the twin seat to rotate from side to side about 10° as shown by arrow B. Tension springs are provided between each seat mount and the transverse rod so that the twin seat will return to a level position as the user raises his or her leg or dismounts.

One or more collars, such as collar 38, shown in FIG. 5, may be provided around transverse rod 14 by sliding the collar onto the rod, before sliding seat mount 18b onto the rod, to widen the distance between the twin seats to accommodate a larger person.

Figure 6:
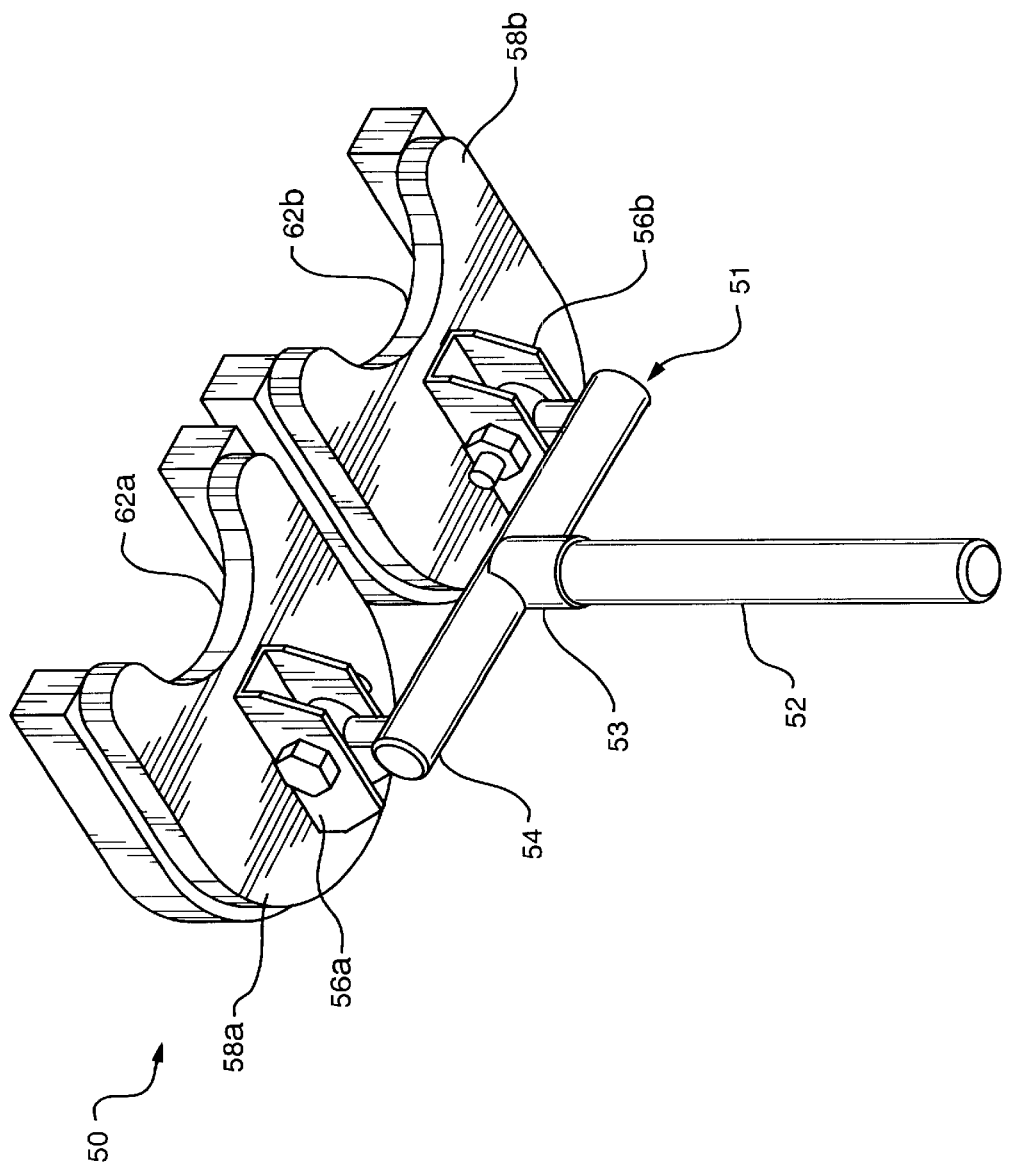
FIG. 6 is a bottom perspective view another preferred embodiment of the split bicycle seat of the invention.
Figure 7:
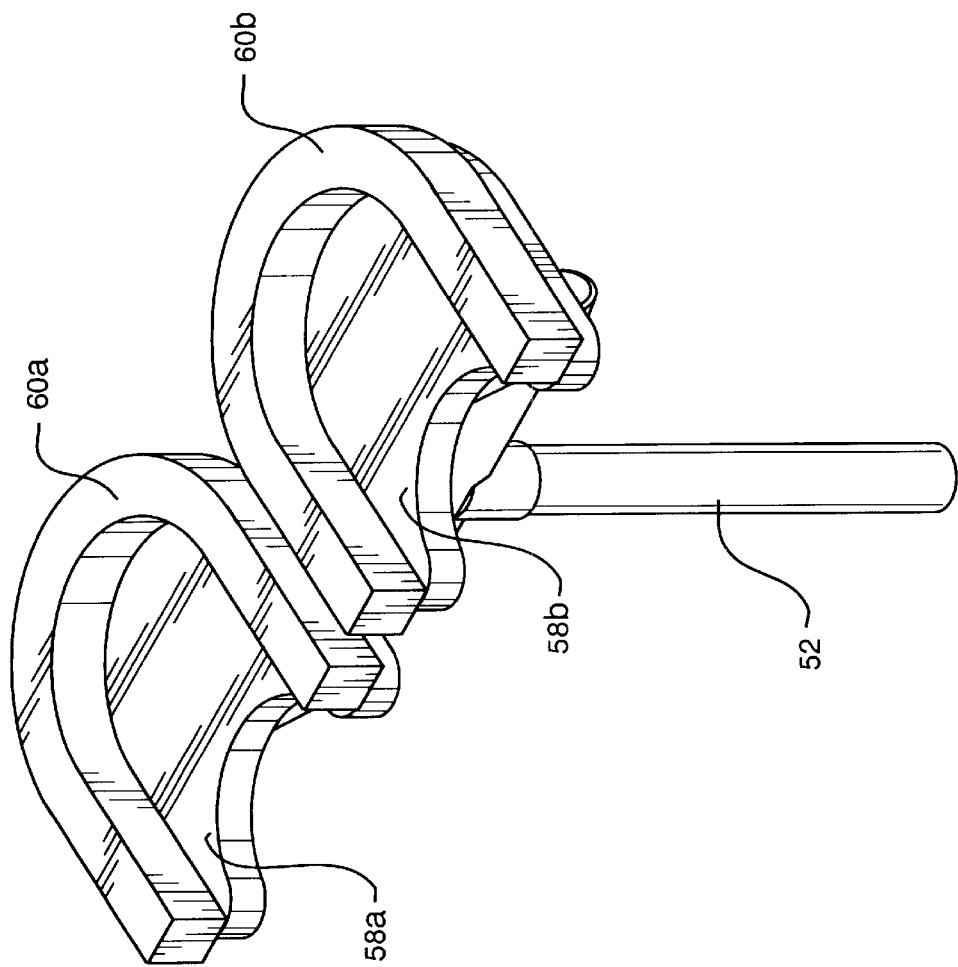
FIG. 7 is a top perspective view of the preferred embodiment of FIG. 6.
Figure 8:
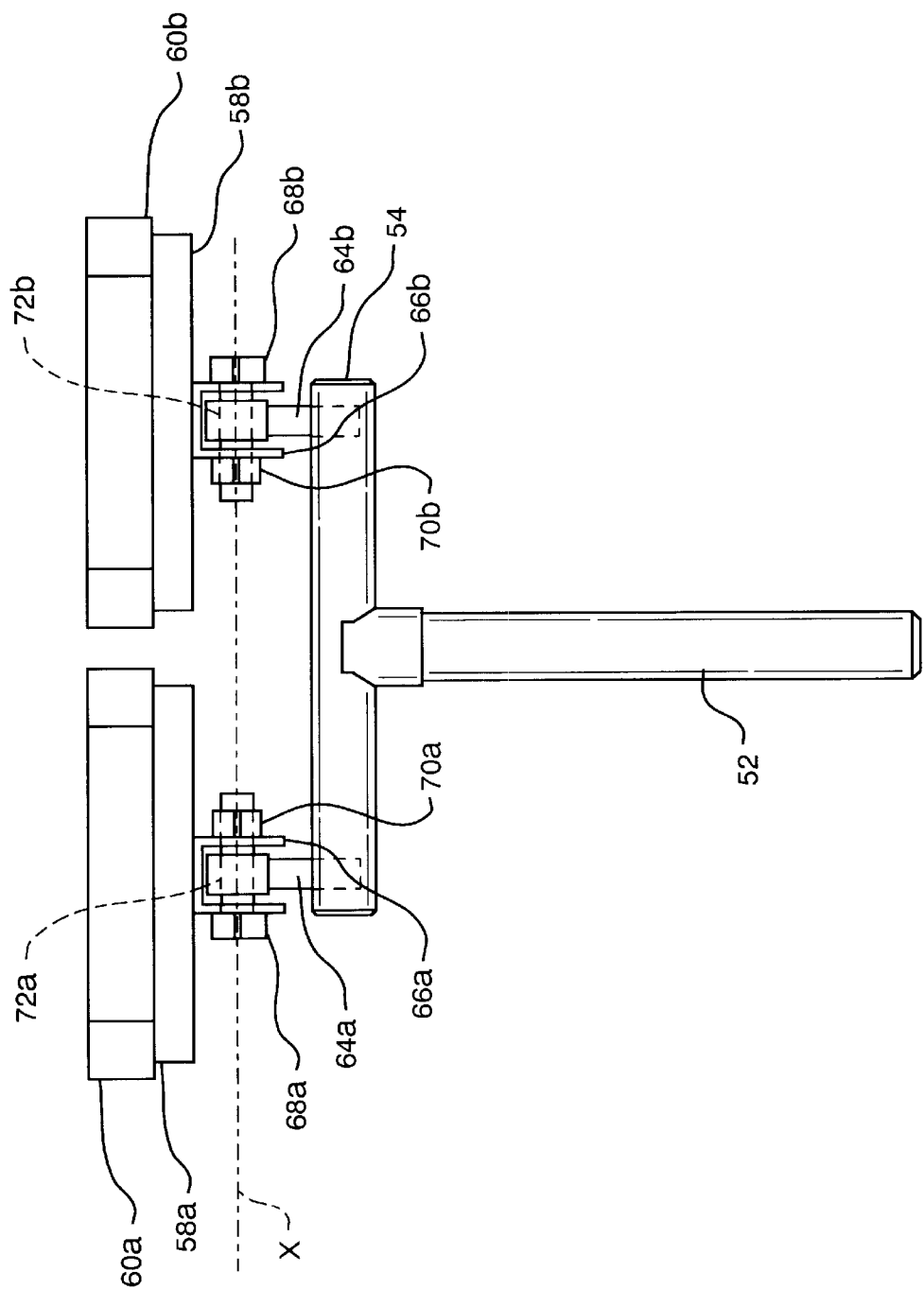
FIG. 8 is a front view of the preferred embodiment of FIG. 6.
Figure 9:
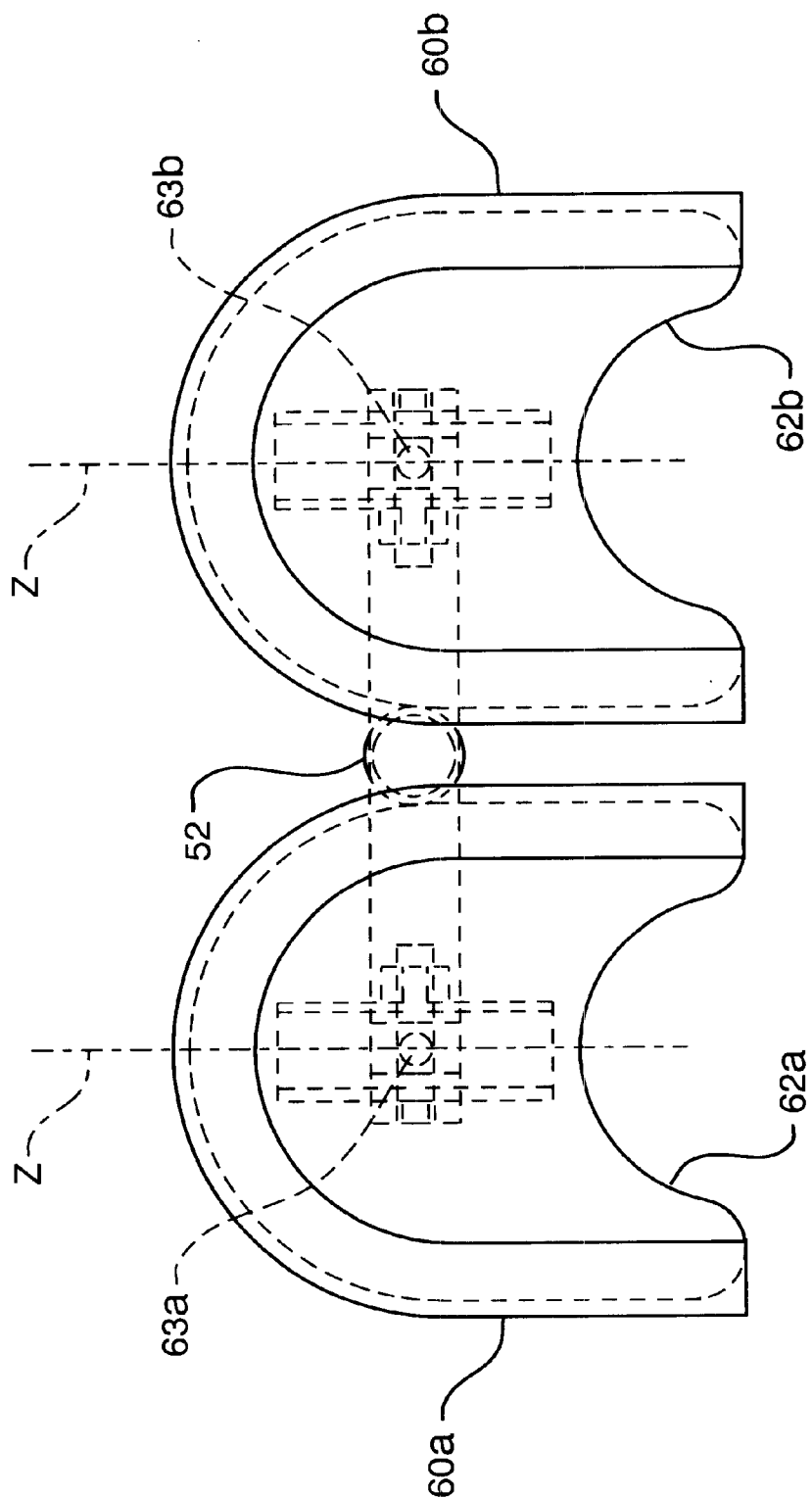
FIG. 9 is a top view of the preferred embodiment of FIG. 6.
Figure 10:
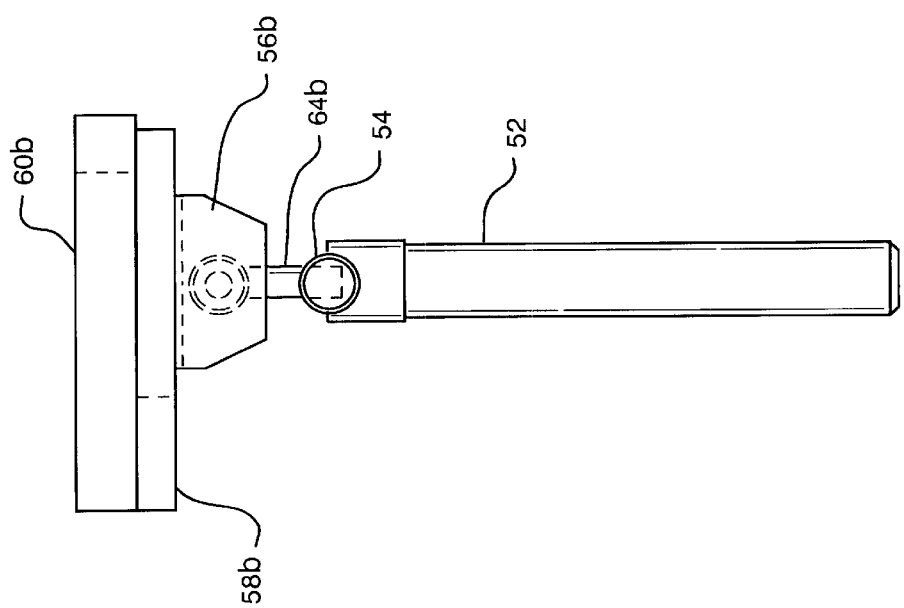
FIG. 10 is a left side view of the preferred embodiment of FIG. 6.

Another preferred embodiment of the split bicycle seat of the invention is shown and generally referred to in FIG. 6 as split seat 50. Seat 50 generally comprises seat mount 51 and two split seat halves 58A and 58B. Seat mount 51 comprises four basic components, vertical shaft 52 fixed to the frame of the bicycle (not shown), transverse rod 54 fixed to vertical shaft 52 using fitting 53, and split seat mounts 56A and 56B. Split seat halves 58A and 58B are fixed to split seat mounts 56A and 56B with vertical bolts 63A and 63B, respectively, as shown in FIG. 9. The front portion of split seat halves 58A and 58B have concave leading edges 62A and 62B, respectively. Seat cushions 60A and 60B are fixed to the split seat halves as shown in FIG. 7 using any suitable means including, but not limited to, an adhesive (not shown). Split seat mounts 56A and 56B are each made up of three primary components. The first component is a three-sided plate, 66A or 66B, comprising a horizontal mounting surface to which the split seat halves are directly fixed using vertical bolts 63A or 63B, and two vertical opposing walls extending downward from the mounting surface. The second component of each seat mount is a pillow block joint, 72A or 72B, which is fixed to transverse rod 54 with vertical connectors or bolts 64A or 64B. The pillow block joint has a bore through the upper portion. A transverse bolt, 68A or 68B, extends through a bore in each of the vertical opposing walls and the bore through the pillow block joint, interposed between the vertical opposing walls, along transverse axis X, so that the split seats are capable of rotating at least partially forward and back around axis X as the user of the bicycle raises his or her legs up in down when pedaling the bicycle. Nuts 70A and 70B are used to hold bolts 68A and 68B, respectively, in place. Similar to the first described split seat 10, the pillow block joint facilitates the natural outward and inward rolling action of the user's hip. The pillow block joint allows the split seats to rotate about longitudinal axis Z (FIG. 9), in effect, from side to side, about 10°. Tension springs (not shown) are provided so that the split seats will return to a level position as the user raises his or her leg or dismounts.

The split seat of the invention is not necessarily limited to a bicycle. The split seat of the invention is designed to be adapted to a variety of circumstances in which an ergonomic, split, form fitting, support seat is desired.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A split seat for a bicycle, comprising;
    a seat mount comprising;
        a vertical shaft;
        a transverse rod fixed to said vertical shaft; and
        two split seat mounts fixed to said transverse rod, each of said seat mounts comprising a pillow block joint, a horizontal mounting surface, two vertical opposing walls extending from said mounting surface having a bore through each of said walls corresponding to a transverse axis of two split seat halves, and a bolt extending transversely through said bores and along said transverse axis so that said split seat halves are capable of rotating at least partially about said bolt; and said two split seat halves having a transverse rotational axis, wherein each of said halves is mounted to said seat mount so that said seat halves are capable of rotating at least partially around said transverse axis independently of one another.

2. The split seat of claim 1, wherein each of said pillow block joints, is interposed between said vertical opposing walls, having a transverse bore through which said bolt extends.

3. The split seat of claim 1, wherein said vertical shaft is adapted to be fixed to said bicycle.

4. The split seat of claim 1, wherein said pillow block joints are fixed to said transverse rod so that said split seat halves are capable of rotating from side to side about a longitudinal axis relative to said split seat.

5. The split seat of claim 4, wherein said pillow block joints are fixed to said transverse rod so that said split seat halves are capable of rotating to each said side about 10°.

6. The split seat of claim 1, wherein each of said pillow block joints is fixed to said transverse rod with a vertical mounting bolt.

7. The split seat of claim 1, wherein said split seat halves are capable of rotating at least partially around said transverse axis independent of each other.

8. The split seat of claim 1, wherein said split seat halves have a front portion having a concave leading edge.

9. The split seat of claim 1, further comprising at least one seat cushion fixed to each of said split seat halves.

10. The split seat of claim 1, wherein said split seat halves are capable of rotating from side to side about a longitudinal axis independent of each other.

* * * * *